(12) United States Patent
Wallasch

(10) Patent No.: US 7,267,023 B2
(45) Date of Patent: Sep. 11, 2007

(54) MITER GEAR TRANSMISSION

(76) Inventor: Edmund Kurt Wallasch, 3762 Ramsdell Ave., Glendale, CA (US) 91214

( * ) Notice: Subject to any disclaimer, the term of this patent is extended or adjusted under 35 U.S.C. 154(b) by 228 days.

(21) Appl. No.: 11/210,070

(22) Filed: Aug. 23, 2005

(65) Prior Publication Data

US 2007/0044585 A1    Mar. 1, 2007

(51) Int. Cl.
F16H 3/22    (2006.01)
(52) U.S. Cl. ............ 74/349; 74/348; 74/347; 74/344; 74/321; 74/320
(58) Field of Classification Search .......... 74/320, 74/321, 344, 347, 348, 349
See application file for complete search history.

(56) References Cited

U.S. PATENT DOCUMENTS

| | | | |
|---|---|---|---|
| 589,266 A | 8/1897 | Nedland et al. | |
| 628,453 A | 7/1899 | Delane | |
| 630,291 A | 8/1899 | Lane et al. | |
| 641,465 A | 1/1900 | McNeill | |
| 707,359 A | 8/1902 | Scharbach | |
| 724,312 A | 3/1903 | Miller | |
| 765,630 A | 7/1904 | McLachian | |
| 823,369 A | 6/1906 | Schroeder | |
| 871,337 A | 11/1907 | Hawley et al. | |
| 874,978 A | 12/1907 | Munger | |
| 875,321 A | 12/1907 | Carter | |
| 955,244 A | 4/1910 | Wynn | |
| 964,847 A | 7/1910 | Brunhouse | |
| 973,979 A | 10/1910 | Schadt et al. | |
| 1,023,862 A | 4/1912 | McBrair | |
| 1,185,417 A | 5/1916 | Lucas | |
| 1,431,649 A * | 10/1922 | Gillette | 74/721 |
| 1,453,478 A | 5/1923 | Osborn | |
| 1,528,574 A | 3/1925 | Schaum | |
| 1,606,869 A * | 11/1926 | Christophel | 74/349 |
| 1,988,182 A | 1/1935 | Weiland | |
| 2,430,169 A | 11/1947 | Grant | |
| 2,673,472 A * | 3/1954 | Dickas et al. | 74/348 |
| 2,875,628 A | 3/1959 | Walter | |
| 2,936,641 A | 5/1960 | Voelki | |
| 3,298,238 A * | 1/1967 | Lea | 74/721 |
| 3,349,636 A | 10/1967 | Colpo | |
| 3,793,910 A * | 2/1974 | Nasvytis | 475/185 |
| 3,885,473 A * | 5/1975 | Stratienko | 74/349 |
| 4,590,815 A * | 5/1986 | Sargent | 477/37 |
| 4,621,542 A * | 11/1986 | Asano et al. | 475/193 |

(Continued)

*Primary Examiner*—David D. Le
(74) *Attorney, Agent, or Firm*—David A. Belasco; Belasco Jacobs & Townsley, LLP

(57) ABSTRACT

A miter gear transmission includes a driving shaft, an idler cluster and a driven shaft. The idler cluster includes two cone-shaped gear sets, each having a proximate end with a gear having a largest number of teeth and a distal end with a gear having a smallest number of teeth. Gears with a decreasing number of teeth are located between the proximate and distal ends. The two gear sets are joined at their proximate ends. The idler cluster is suspended in bearings at a 45 degree angle between the driving and driven shafts with first and second spur gears slidably engaged to the shafts. Two actuator moves the spur gears along the shafts to engage the gear teeth of each of gears of the gear sets. By moving the spur gears to engage different gears, different gear ratios are achieved. A cable loop shifter moves the actuators along the shafts.

16 Claims, 12 Drawing Sheets

U.S. PATENT DOCUMENTS

| | | |
|---|---|---|
| 4,630,495 A | 12/1986 | Smith |
| 4,955,247 A | 9/1990 | Marshall |
| 5,142,942 A * | 9/1992 | Fukaya ........................ 74/650 |
| 5,653,143 A | 8/1997 | Langevin |
| 6,321,613 B1 | 11/2001 | Avidor |
| 6,802,229 B1 | 10/2004 | Lambert |

* cited by examiner

MITER GEAR TRANSMISSION

FIELD OF INVENTION

The invention pertains to power transmission systems. More particularly, the invention relates to compact, multi-speed transmissions providing a large number of ratio selections.

BACKGROUND OF THE INVENTION

As most power sources operate most efficiently at certain rpm ranges. This is especially true for human power sources, for example as applied to human powered bicycles. For this reason, it is desirable that a transmission provide a number of different gear ratios to enable the power source to operate most often at its peak rpm range, where most of its torque is available. Transmissions that provide a large number of gear ratios, as is particularly desirable for human powered machines, are often very complex, delicate and often heavy. A number of potential designs for multi-speed transmissions have been developed. Some significant examples include the following.

U.S. Pat. No. 2,875,628, issued to Walter, is directed to a variable speed transmission having two identical conically shaped sets of gears each mounted on a shaft that are parallel to each other. Power is transmitted from one set to the other through a transmission gear, an idler gear that can freely rotate about a shaft which is guided in position by a rod. The gear can be shifted axially and stepwise by a handle. When shifting into adjacent gears are engaged a smooth trouble free shift is ensured by having every other gear in the set rigidly coupled to the shaft and these rigidly coupled gears frictionally engage the gears that are interposed between them. Frictional linings are interposed between all the gears and the friction force can be controlled by tightening the end clamps on the shaft.

U.S. Pat. No. 2,936,641, issued to Voelkl, is directed to a variable speed transmission having two sets of gears each forming a cone shaped assembly of gears of a different diameter, a power transmitting gear is coupled between the two sets of gears and therefore the transmitted gear ratio being controlled by a hand wheel and lead screw. Two overrunning clutches are mounted between each of the gears and its supporting shaft. When the power transferred gear is positioned so as to engage two gears of each cluster smooth operation is provided by the overrunning clutches decoupling the power from the slower turning gear.

U.S. Pat. No. 1,528,574, issued to Schaum, and U.S. Pat. No. 6,802,229, issued to Lambert are directed to continuously variable transmissions having a cone shaped gear having helical tooth pattern that mesh with a spur gear.

U.S. Pat. No. 5,653,143, issued to Langevin, and U.S. Pat. No. 6,321,613, issued to Avidor are directed to variable ratio transmissions systems having a sliding spur gear that can be positioned to engage one of a plurality of conical gear wheels.

U.S. Pat. No. 4,630,495, issued to Smith is directed to a continuously variable ratio power transmission comprising two helically patterned cone shaped gears that provide a transmission that is continuous and in constant mesh and has a wide range of gear ratio.

It is an objective of the present invention to provide a durable, compact, lightweight transmission capable of providing a wide range of available gear ratios. It is a further objective to provide a transmission which is sealed from contact with dirt and other contaminates. It is yet a further objective to provide a transmission adaptable to use with either an inline or transverse final drive train. Finally, it is an objective to provide a transmission which can work without a clutching mechanism.

While some of the objectives of the present invention are disclosed in the prior art, none of the inventions found include all of the requirements identified.

SUMMARY OF THE INVENTION (1) A miter gear transmission having all of the desired features can be constructed from the following components. A mounting platform is provided. At least one bearing is attached to the mounting platform. An idler cluster is provided. The idler cluster has first and second gear sets, first and second ends, a center point located between the first and second ends and is rotatably mounted to the at least one bearing.

The first gear set includes a plurality of first gears. The gears have decreasing numbers of gear teeth and are attached to the idler cluster from a point adjacent the center point outwardly toward the first end with a first gear that has a largest number of teeth closest to the center point and with a first gear that has a smallest number of teeth closest to the first end.

The second gear set includes a plurality of second gears. The second gears have decreasing numbers of gear teeth and are attached to the idler cluster from a point adjacent the center point outwardly toward the second end with a second gear that has a largest number of teeth closest to the center point and with a second gear that has a smallest number of teeth closest to the second end. A driving shaft is provided. The driving shaft has a first end, a second end, a first rotational securing means and is mounted at the first and second ends in bearings attached to the mounting platform. The driving shaft is mounted at a forty-five degree angle to the idler cluster. A first spur gear is provided. The first spur gear is slidably mounted to the driving shaft and has a first mating rotational securing means that slidably engages the first rotational securing means. A first actuator is provided. The first actuator moves the first spur gear along the driving shaft to engage alternately each of the gears of the first gear set.

A driven shaft is provided. The driven shaft has a first end, a second end, a second rotational securing means and is mounted at the first and second ends in bearings attached to the mounting platform. The driven shaft is mounted at a forty-five degree angle to the idler cluster. A second spur gear is provided. The second spur gear is slidably mounted to the driven shaft and has a second mating rotational securing means that slidably engages the second rotational securing means. A second actuator is provided. The second actuator moves the second spur gear along the driven shaft to engage alternately each of the gears of the second gear set.

When the first actuator positions the first spur gear to engage one of the gears of the first gear set and the second actuator positions the second spur gear to engage one of the of gears of the second gear set, the driving shaft will rotate the idler cluster which will rotate the driven shaft at a speed determined by the ratios selected by the first and second actuators.

(2) In a variant of the invention, each of the first and second rotational securing means includes at least one longitudinal keyway extending along each of the driving and driven shafts. Each of the first and second mating rotational securing means includes at least one mating longitudinal key located within a central aperture in each of the first and second spur gears.

(3) In another variant, each of the first and second rotational securing means includes at least one longitudinal key extending along each of the driving and driven shafts. Each of the first and second mating rotational securing means includes at least one mating longitudinal keyway located within a central aperture in each of the first and second spur gears.

(4) In still another variant, each of the first and second rotational securing means includes at least one longitudinal, partial cylindrical trough extending along each of the driving and driven shafts. Each of the first and second mating rotational securing means includes at least one mating partial cylindrical trough located within a central aperture in each of the first and second spur gears. At least one ball bearing is provided. The ball bearing is sized and shaped to fit slidably between the partial cylindrical trough and the mating partial cylindrical trough. The ball bearing is located between each of the partial cylindrical troughs and each of the mating partial cylindrical troughs. When either of the first and second actuators moves the first and second spur gears along the driving and driven shafts, friction relating to the movement will be reduced.

(5) In yet another variant, each of the partial cylindrical trough and the mating partial cylindrical trough enclose at least two ball bearings. At least one of the ball bearings extends outwardly beyond one of an inner and an outer lateral edge of a central aperture in either of the first and second spur gears. Portions of the ball bearings extending outwardly beyond one of the inner and the outer lateral edge serve as a thrust bearing for either of the first and second actuators.

(6) In a further variant, each of the partial cylindrical trough and the mating partial cylindrical trough enclose at least four ball bearings. The mating cylindrical trough includes a centrally located barrier ledge. The ledge abuts first and second center mounted ball bearings and is sized to cause innermost and outermost ball bearings to extend outwardly beyond one of the inner and the outer lateral edges, respectively.

(7) In still a further variant, the idler cluster includes first and second hollow shell portions. Each of the shell portions has a larger proximate end and a smaller distal end, a plurality of gear rings arcurately surrounding a centerline of the shell portion with a largest gear ring adjacent the proximate end and smaller gear rings extending toward the distal end. The first and second shell portions are joined at the proximate ends and have first and second bearing mounted at the distal ends. The bearings attach to bearing mounts secured to the mounting platform.

(8) In another variant of the invention, each of the gear teeth is tapered to accommodate the forty-five degree angle between the idler cluster and each of the driving and driven shafts.

(9) In yet another variant, each of the gear teeth is divided at a centerline between a back edge of the tooth, closest to the center point and a front edge, closest to one of the first and second ends of the idler cluster. Each of the gear teeth tapers from the centerline toward the front edge. The taper is more acute for the gears that have the smallest number of teeth and less acute for gears that have larger numbers of teeth.

(10) In still another variant, each of the actuators includes first and second thrust plates. The thrust plates are located on either side of each of the first and second spur gears. At least one bushing is provided. The bushing spaces apart the pairs of thrust plates. At least one control rod is provided. The control rod is sized and shaped to fit slidably within the at least one bushing and extends along each of the driving and driven shafts. The control rod is secured at either end to the mounting platform. The thrust plates and each of the first and second spur gears are displaced along the control rod by a shift mechanism. When the shift mechanism displaces the thrust plates along the control rod, alternative gear combinations will be selected.

(11) In a further variant, the first and second thrust plates are spaced apart by four bushings. Two of the bushings secure together the thrust plates and two of the bushings each fit slidably over one of two control rods.

(12) In still a further variant, the shift mechanism includes a looped cable. The looped cable has a first portion and a second portion. The first portion is attached at a first end to the first thrust plate and attached at a second end to a cable winder. The second portion is attached at a first end to the second thrust plate and attached at a second end to the cable winder. The winder tightens the first portion and loosens the second portion when moved in a first direction. The winder tightens the second portion and loosens the first portion when moved in an opposite second direction. When the cable winder is moved in the first direction, the actuator will move one of the spur gears to engage gears with larger numbers of teeth and when the cable winder is moved in the second direction, the actuator will move one of the spur gears to engage gears with smaller numbers of teeth.

(13) In yet a further variant, the shift mechanism includes a cable sheath. The sheath encloses the first and second portions and is secured to the mounting platform, thereby permitting the cable winder to be flexibly mounted.

(14) In another variant, the driven shaft is parallel to the driving shaft.

(15) In yet another variant, the driven shaft is perpendicular to the driving shaft.

(16) In a final variant of the invention, the bearings mounting at least one of the driving shaft and the driven shaft are attached to surfaces perpendicular to the mounting platform.

DESCRIPTION OF THE DRAWINGS

DETAILED DESCRIPTION OF THE PREFERRED EMBODIMENT (1) FIGS. 1, 5 and 6 illustrate a miter gear transmission 10 having all of the desired features can be constructed from the following components. A mounting platform 14 is provided. At least one bearing 18 is attached to the mounting platform 14. An idler cluster 22 is provided. The idler cluster 22 has first 26 and second 30 gear sets, first 34 and second 38 ends, a center point 42 located between the first 34 and second 38 ends and is rotatably mounted to the at least one bearing 18. The first gear set 26 includes a plurality of first gears 46. The first gears 46 have decreasing numbers of gear teeth 50 and are attached to the idler cluster 22 from a point 54 adjacent the center point 42 outwardly toward the first end 34 with a first gear 214 that has a largest number of teeth 50 closest to the center point 42 and with a first gear 218 that has a smallest number of teeth 50 closest to the first end 34.

Figure 1:
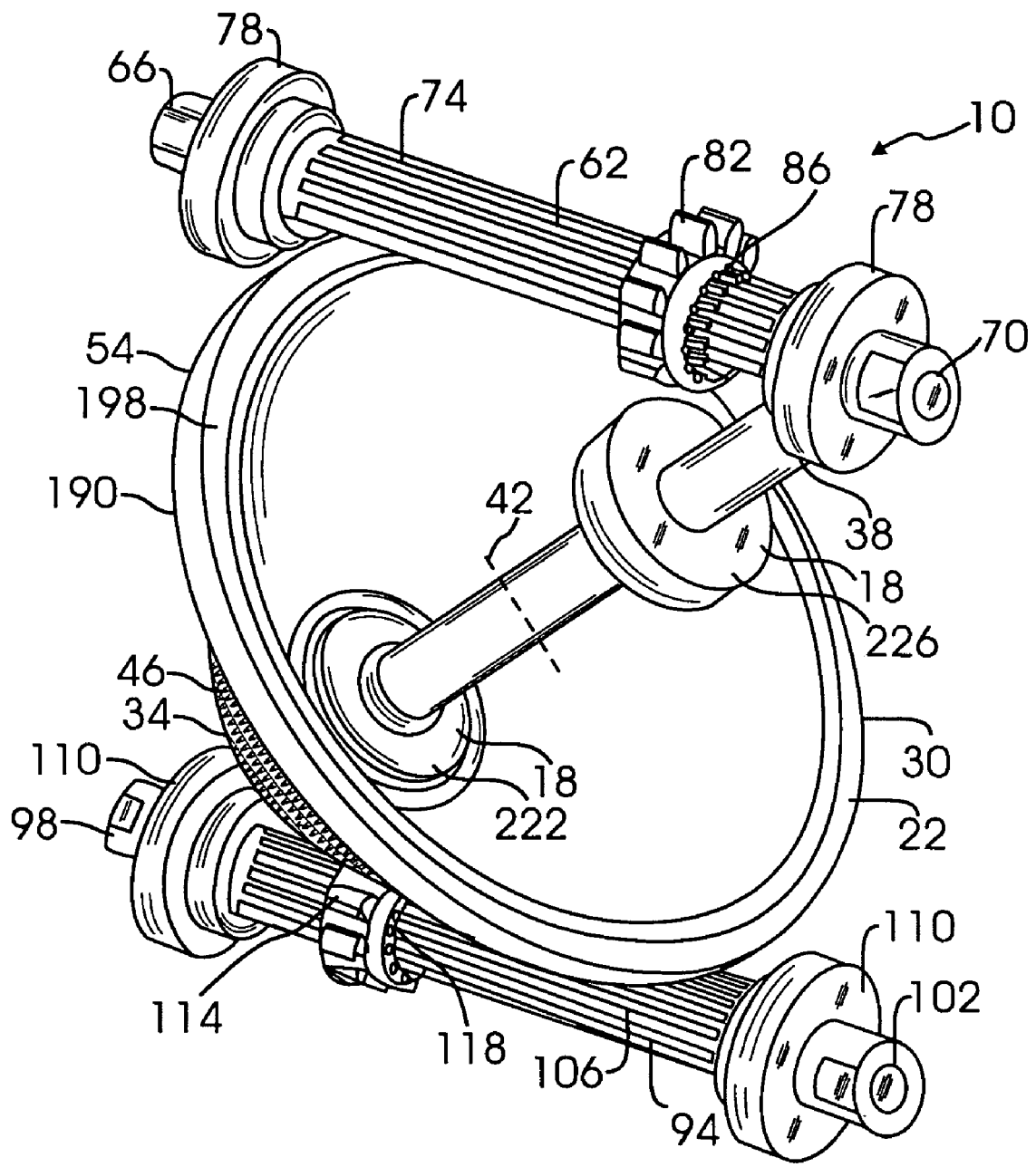
FIG. 1 is a cutaway perspective view of the preferred embodiment of the invention illustrating placement of bearings for the idler cluster, driving and driven shafts.

The second gear set 30 includes a plurality of second gears 46. The second gears 46 have decreasing numbers of gear teeth 50 and are attached to the idler cluster 22 from a point 58 adjacent the center point 42 outwardly toward the second end 38 with a second gear 214 that has a largest number of teeth 50 closest to the center point 42 and with a second gear 218 that has a smallest number of teeth 50 closest to the second end 38. A driving shaft 62 is provided. The driving shaft 62 has a first end 66, a second end 70, a first rotational securing means 74 and is mounted at the first 66 and second 70 ends in bearings 78 attached to the mounting platform 14. The driving shaft 62 is mounted at a forty-five degree angle to the idler cluster 22. A first spur gear 82 is provided. The first spur gear 82 is slidably mounted to the driving shaft 62 and has a first mating rotational securing means 86 that slidably engages the first rotational securing means 74. A first actuator 90 is provided. The first actuator 90 moves the first spur gear 82 along the driving shaft 62 to engage alternately each of the gears 46 of the first gear set 26.

A driven shaft 94 is provided. The driven shaft 94 has a first end 98, a second 102 end, a second rotational securing means 106 and is mounted at the first 98 and second 102 ends in bearings 110 attached to the mounting platform 14. The driven shaft 94 is mounted at a forty-five degree angle to the idler cluster 22. A second spur gear 114 is provided. The second spur gear 114 is slidably mounted to the driven shaft 94 and has a second mating rotational securing means 118 that slidably engages the second rotational securing means 106. A second actuator 122 is provided. The second actuator 122 moves the second spur gear 114 along the driven shaft 94 to engage alternately each of the gears 46 of the second gear set 30.

When the first actuator 90 positions the first spur gear 82 to engage one of the gears 46 of the first gear set 26 and the second actuator 122 positions the second spur gear 114 to engage one of the of gears 46 of the second gear set 30, the driving shaft 62 will rotate the idler cluster 22 which will rotate the driven shaft 94 at a speed determined by the ratios selected by the first 90 and second 122 actuators.

Figure 3A:
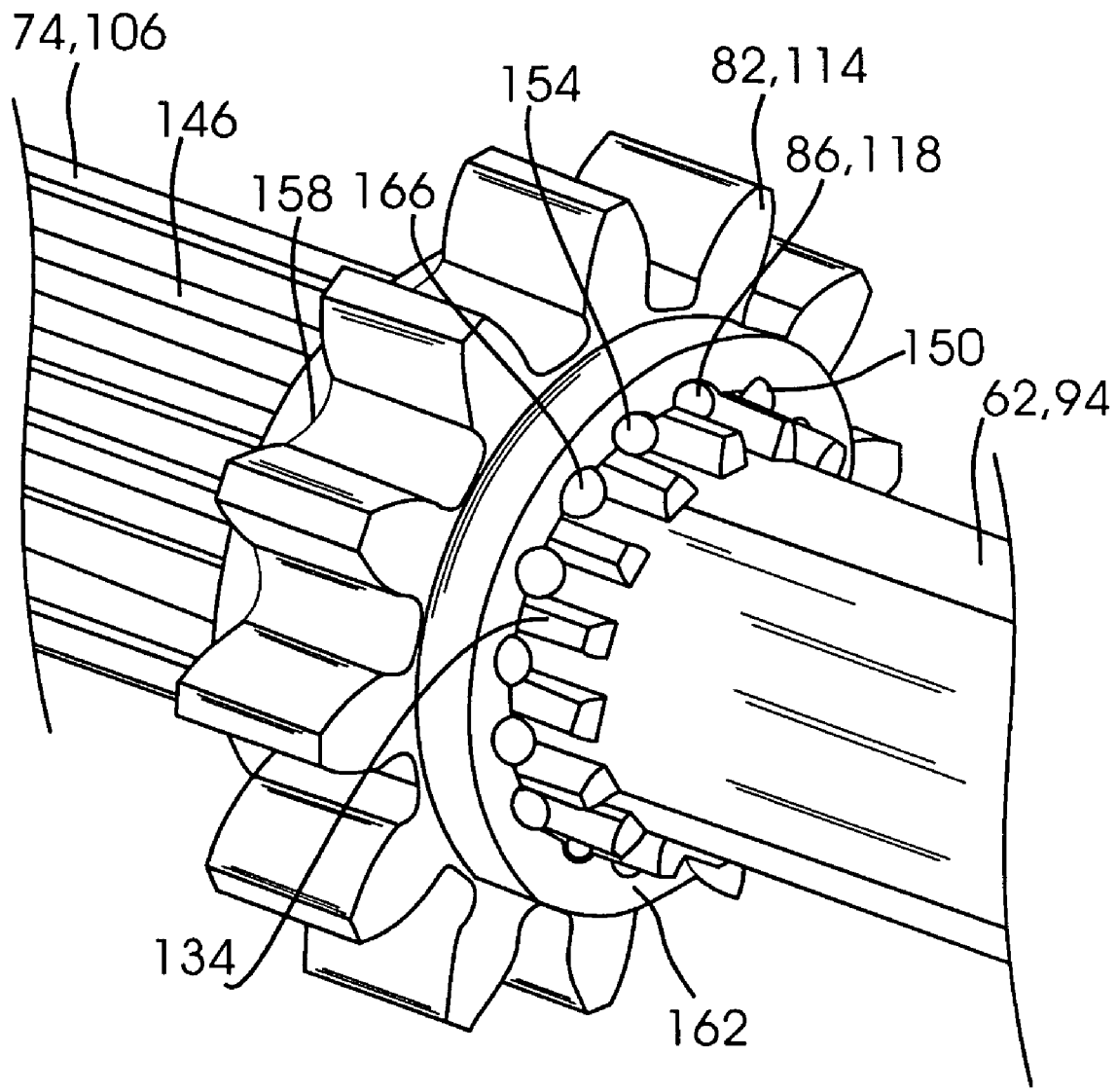
FIG. 3A a perspective view of one of the spur gears disposed upon one of the driving and driven shafts illustrating a first embodiment of the rotational securing means and mating rotational securing means.
Figure 3B:
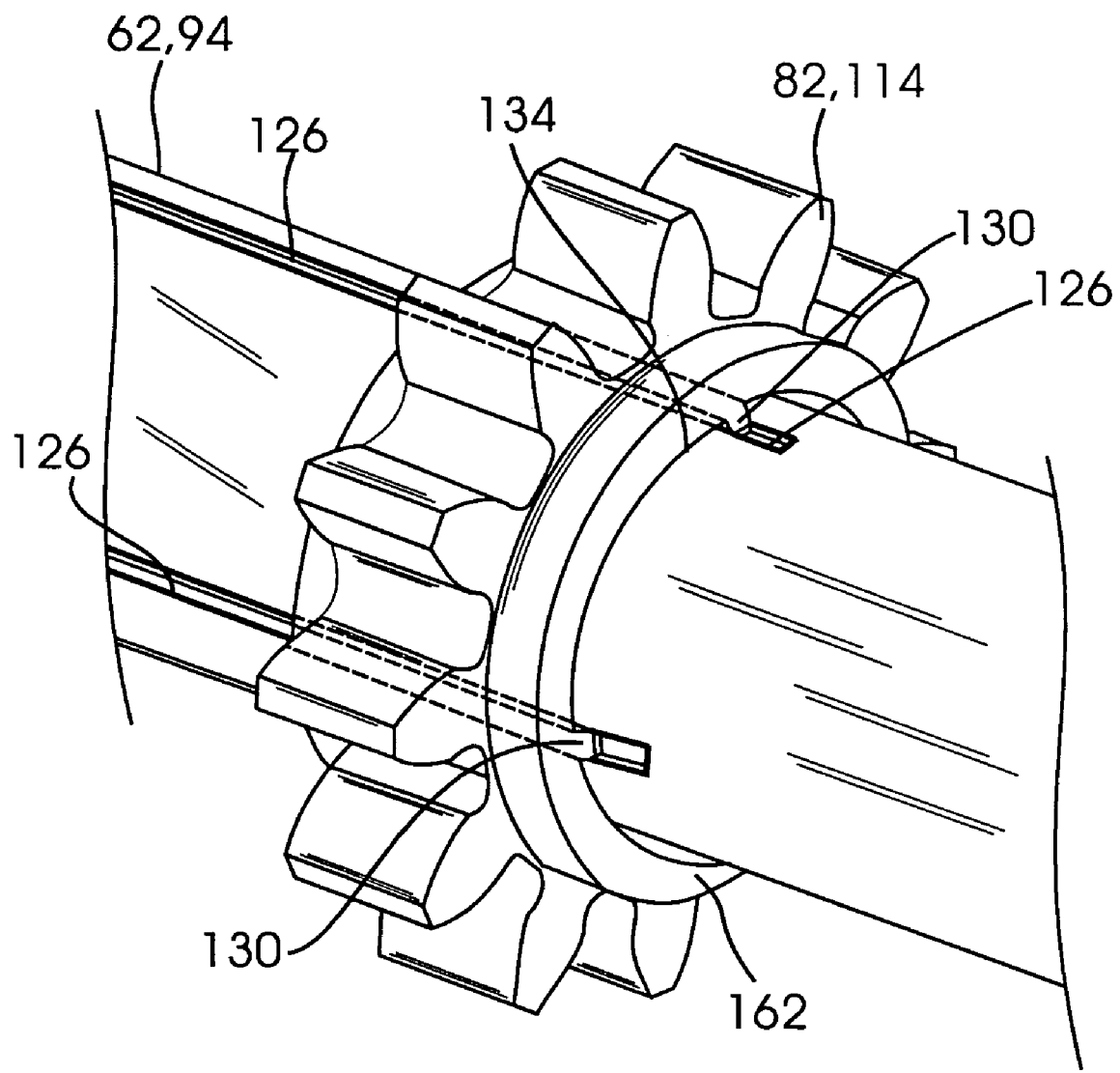
FIG. 3B a perspective view of one of the spur gears disposed upon one of the driving and driven shafts illustrating a second embodiment of the rotational securing means, involving a longitudinal keyway, and mating rotational securing means, involving a mating longitudinal key in the spur gear aperture.

(2) In a variant of the invention, as illustrated in FIG. 3B, each of the first 74 and second 106 rotational securing means includes at least one longitudinal keyway 126 extending along each of the driving 62 and driven 94 shafts. Each of the first 86 and second 118 mating rotational securing means includes at least one mating longitudinal key 130 located within a central aperture 134 in each of the first 82 and second 114 spur gears.

Figure 3C:
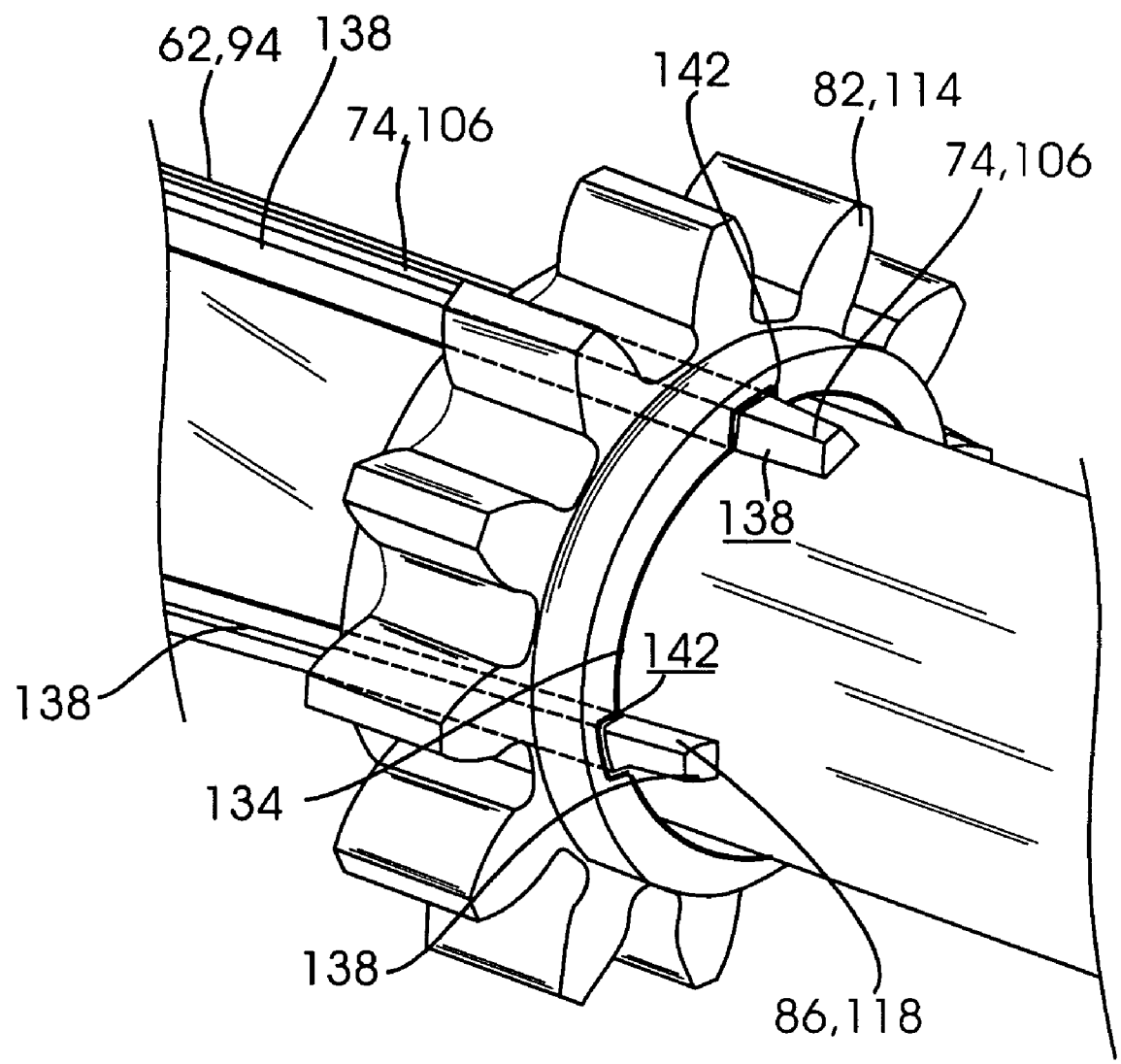
FIG. 3C a perspective view of one of the spur gears disposed upon one of the driving and driven shafts illustrating a third embodiment of the rotational securing means, involving a longitudinal key, and mating rotational securing means involving a mating longitudinal keyway in the spur gear aperture.

(3) In another variant, as illustrated in FIG. 3C, each of the first 74 and second 106 rotational securing means includes at least one longitudinal key 138 extending along each of the driving 62 and driven 94 shafts. Each of the first 86 and second 118 mating rotational securing means includes at least one mating longitudinal keyway 142 located within a central aperture 134 in each of the first 82 and second 114 spur gears.

Figure 2:
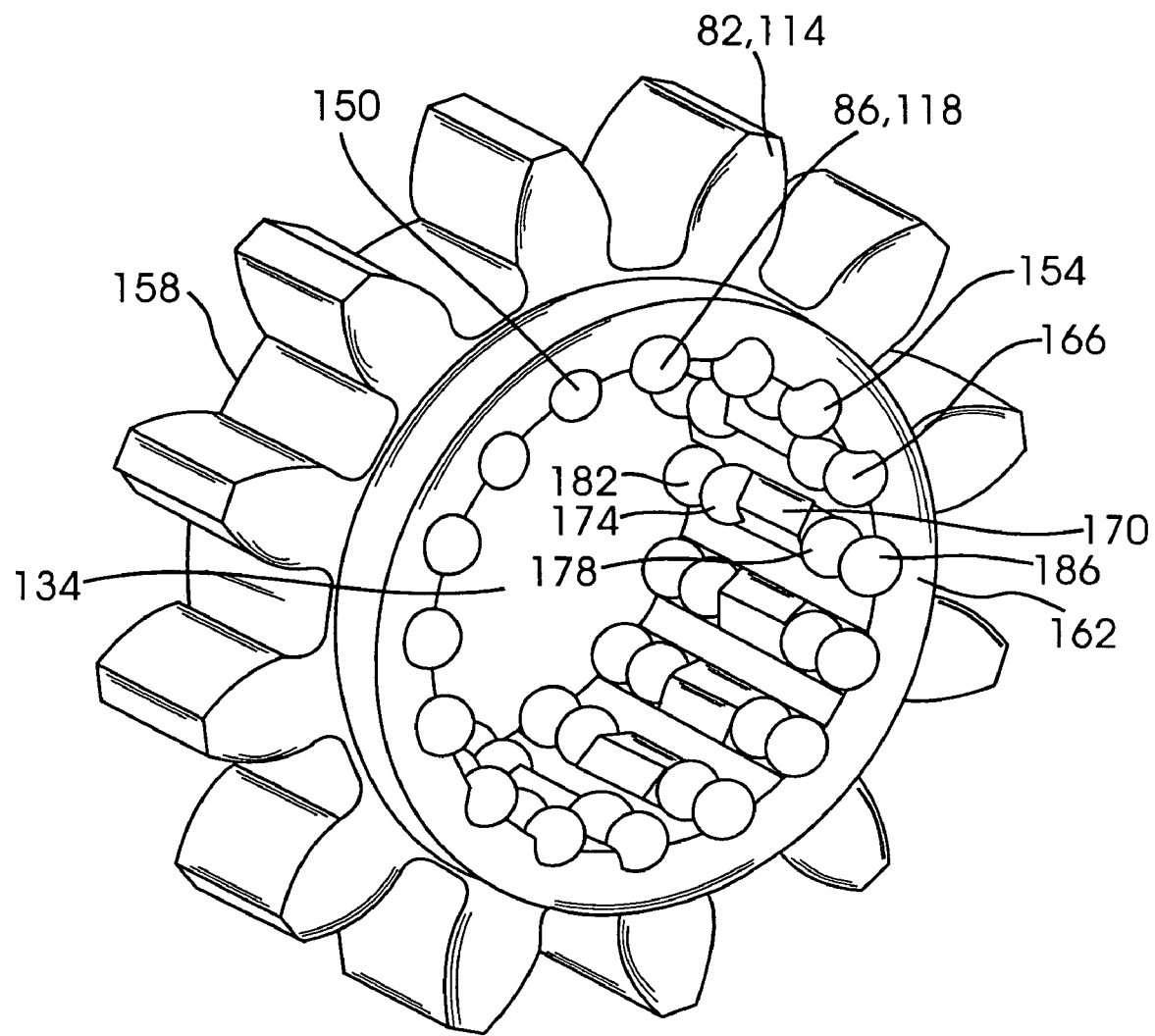
FIG. 2 is a perspective view of one of the spur gears illustrating the ball bearings and the centrally located barrier ledge.

(4) In still another variant, as illustrated in FIGS. 2 and 3A, each of the first 74 and second 106 rotational securing means includes at least one longitudinal, partial cylindrical trough 146 extending along each of the driving 62 and driven 94 shafts. Each of the first 86 and second 118 mating rotational securing means includes at least one mating partial cylindrical trough 150 located within a central aperture 134 in each of the first 82 and second 114 spur gears. At least one ball bearing 154 is provided. The ball bearing 154 is sized and shaped to fit slidably between the partial cylindrical trough 146 and the mating partial cylindrical trough 150. The ball bearing 154 is located between each of the partial cylindrical troughs 146 and each of the mating partial cylindrical troughs 150. When either of the first 90 and second 122 actuators moves the first 82 and second 114 spur gears along the driving 62 and driven 94 shafts, friction relating to the movement will be reduced.

(5) In yet another variant, each of the partial cylindrical trough 146 and the mating partial cylindrical trough 150 enclose at least two ball bearings 154. At least one of the ball bearings 154 extends outwardly beyond one of an inner 158 and an outer 162 lateral edge of a central aperture 134 in either of the first 82 and second 114 spur gears. Portions of the ball bearings 154 extending outwardly beyond one of the inner 158 and the outer 162 lateral edge serve as a thrust bearing 166 for either of the first 90 and second 122 actuators.

(6) In a further variant, each of the partial cylindrical trough 146 and the mating partial cylindrical trough 150 enclose at least four ball bearings 154. The mating cylindrical trough 150 includes a centrally located barrier ledge 170. The ledge 170 abuts first 174 and second 178 center mounted ball bearings and is sized to cause innermost 182 and outermost 186 ball bearings to extend outwardly beyond one of the inner 158 and the outer 162 lateral edges, respectively.

(7) In still a further variant, as illustrated in FIGS. 1, 5, 6 and 10, the idler cluster 22 includes first 190 and second 194 hollow shell portions. Each of the shell portions 190, 194 has a larger proximate end 198 and a smaller distal end 202, a plurality of gear rings 206 arcuately surrounding a centerline 210 of the shell portion 190, 194 with a largest gear ring 214 adjacent the proximate end 198 and smaller gear rings 218 extending toward the distal end 202. The first 190 and second 194 shell portions are joined at the proximate ends 198 and have first 222 and second 226 bearing mounted at the distal ends 202. The bearings 222, 226 attach to bearing mounts 230 secured to the mounting platform 14.

Figure 4:
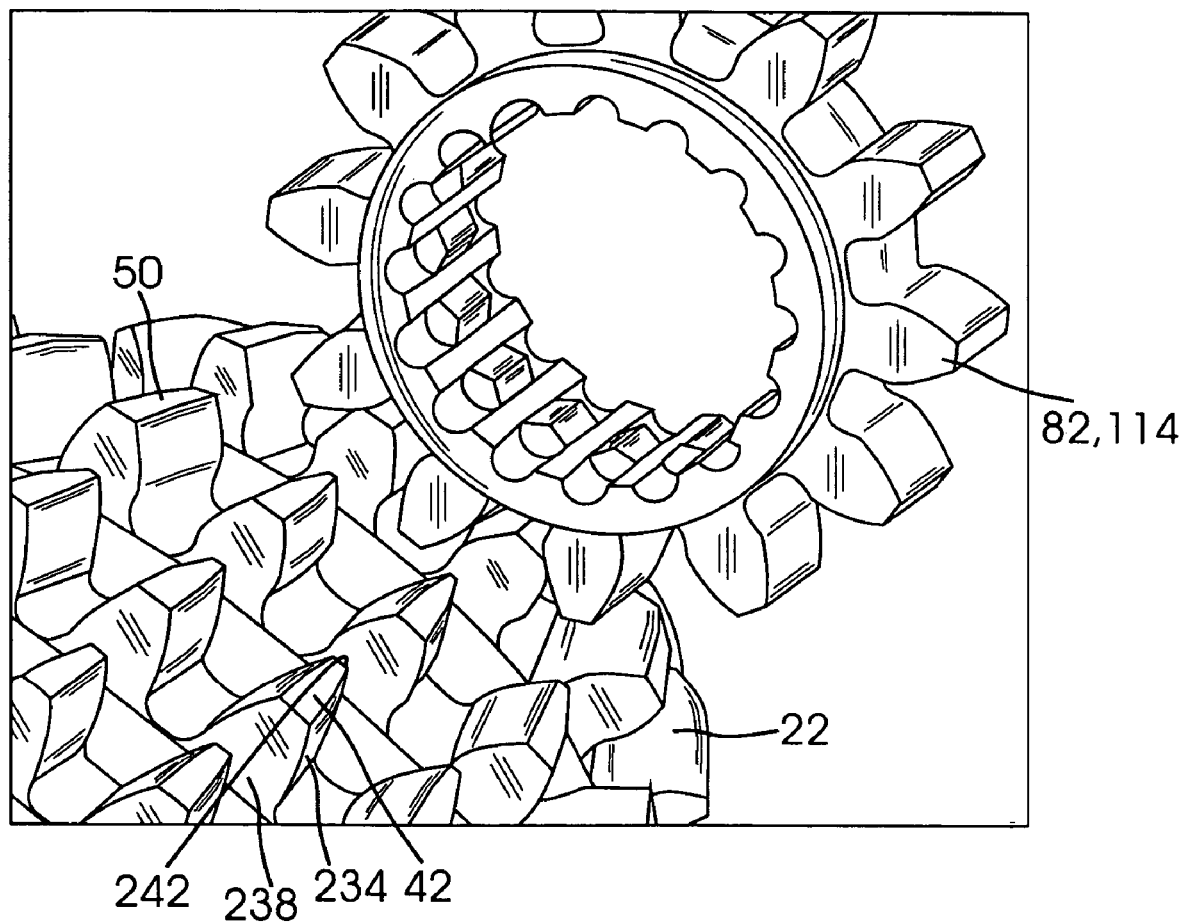
FIG. 4 is a detailed perspective view of one of the spur gears engaging one of the gear sets of the idler cluster.
Figure 7:
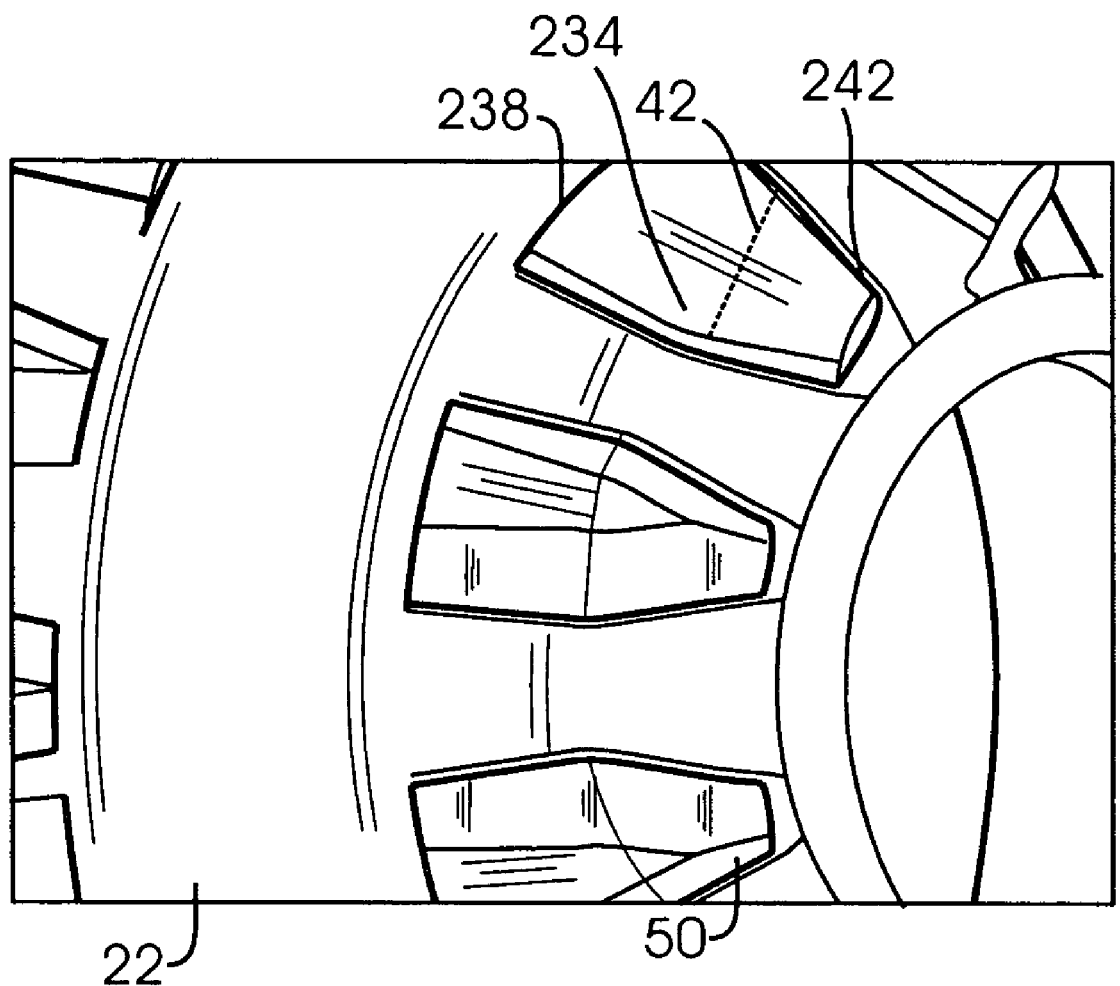
FIG. 7 is a detailed perspective view of one of the gear rings of the idler cluster illustrating the tapering of the teeth.

(8) In another variant of the invention, as illustrated in FIGS. 4 and 7, each of the gear teeth 50 is tapered to accommodate the forty-five degree angle between the idler cluster 22 and each of the driving 62 and driven 94 shafts.

(9) In yet another variant, each of the gear teeth 50 is divided at a centerline 234 between a back edge 238 of the tooth 50, closest to the center point 42 and a front edge 242, closest to one of the first 34 and second 38 ends of the idler cluster 22. Each of the gear teeth 50 tapers from the centerline 234 toward the front edge 242. The taper is more acute for the gears 46 that have the smallest number of teeth 50 and less acute for gears 46 that have larger numbers of teeth 50.

Figure 8:
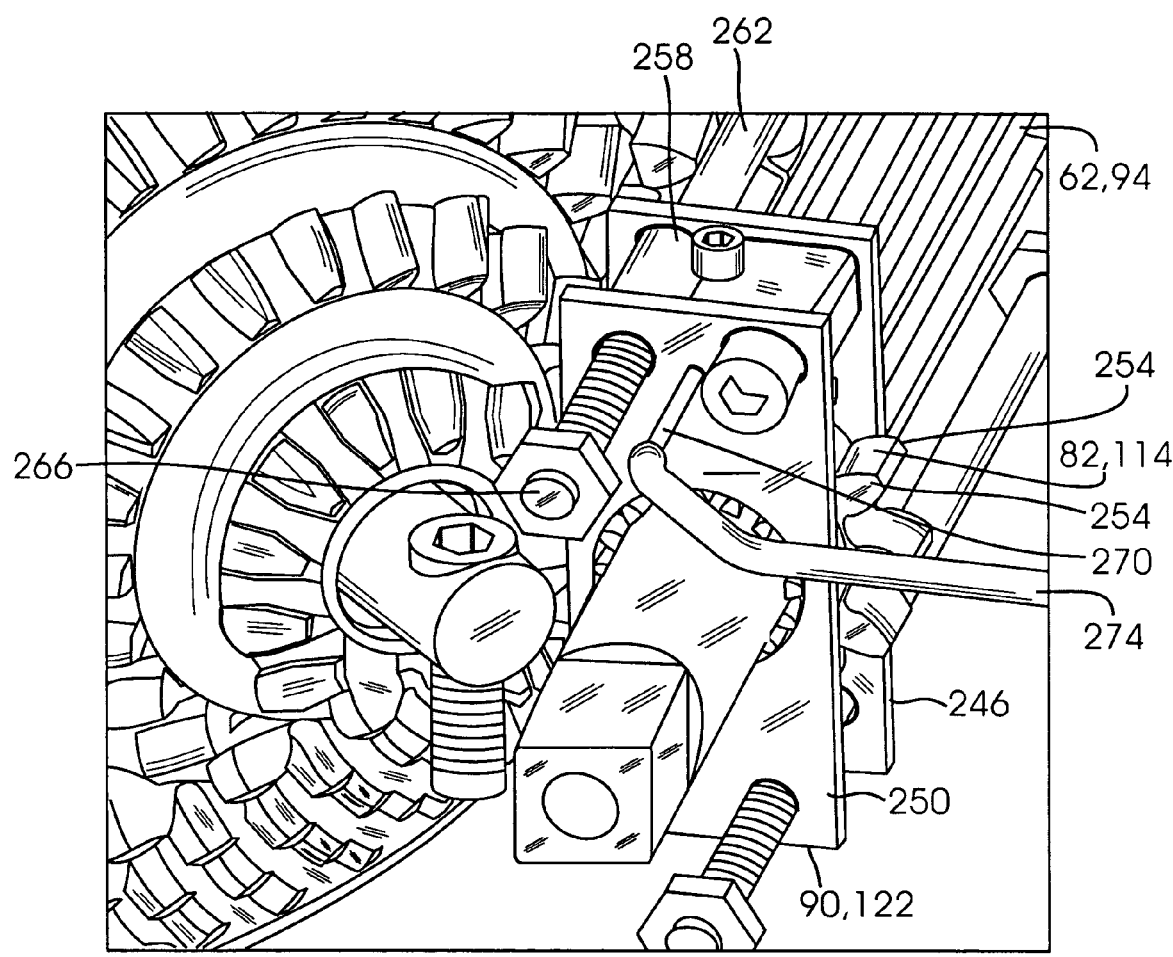
FIG. 8 is a detailed perspective view of idler cluster, driving shaft, spur gear and thrust plate assembly with attached shifter cable.

(10) In still another variant, as illustrated in FIG. 8, each of the actuators 90, 122 includes first 246 and second 250 thrust plates. The thrust plates 246, 250 are located on either side 254 of each of the first 82 and second 114 spur gears. At least one bushing 258 is provided. The bushing 258 spaces apart the pairs of thrust plates 246, 250. At least one control rod 262 is provided. The control rod 262 is sized and shaped to fit slidably within the at least one bushing 258 and extends along each of the driving 62 and driven 94 shafts. The control rod 262 is secured at either end 266 to the mounting platform 14. The thrust plates 246, 250 and each of the first 82 and second 114 spur gears are displaced along the control rod 262 by a shift mechanism 270. When the shift mechanism 270 displaces the thrust plates 246, 250 along the control rod 262, alternative gear combinations will be selected.

(11) In a further variant, the first 246 and second 250 thrust plates are spaced apart by four bushings 258. Two of the bushings 258 secure together the thrust plates 246, 250 and two of the bushings 258 each fit slidably over one of two control rods 262.

Figure 9:
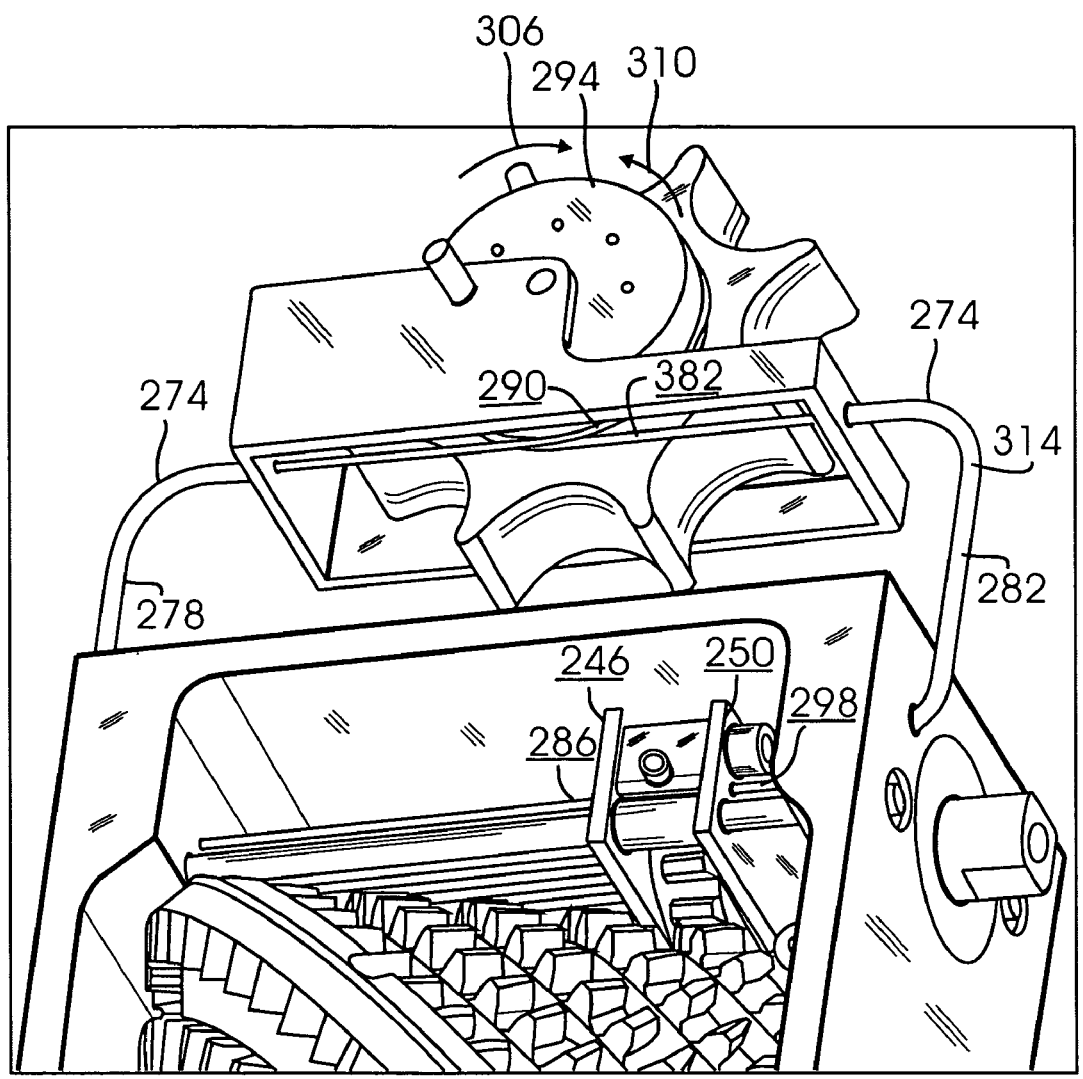
FIG. 9 is a detailed perspective view of the gear box shifter assembly and looped shifter cable.

(12) In still a further variant, as illustrated in FIG. 9, the shift mechanism includes a looped cable 274. The looped cable 274 has a first portion 278 and a second portion 282. The first portion 278 is attached at a first end 286 to the first thrust plate 246 and attached at a second end 290 to a cable winder 294. The second portion 282 is attached at a first end 298 to the second 250 thrust plate and attached at a second end 302 to the cable winder 294. The winder 294 tightens the first portion 278 and loosens the second portion 282 when moved in a first direction 306. The winder 294 tightens the second portion 282 and loosens the first portion 278 when moved in an opposite second direction 310. When the cable winder 294 is moved in the first direction 306, the actuator 90, 122 will move one of the spur gears 82, 114 to engage gears 46 with larger numbers of teeth 50 and when the cable winder 294 is moved in the second direction 310, the actuator 90, 122 will move one of the spur gears 82, 114 to engage gears 46 with smaller numbers of teeth 50.

(13) In yet a further variant, the shift mechanism includes a cable sheath 314. The sheath 314 encloses the first 278 and second 282 portions and is secured to the mounting platform 14, thereby permitting the cable winder 294 to be flexibly mounted.

Figure 5:
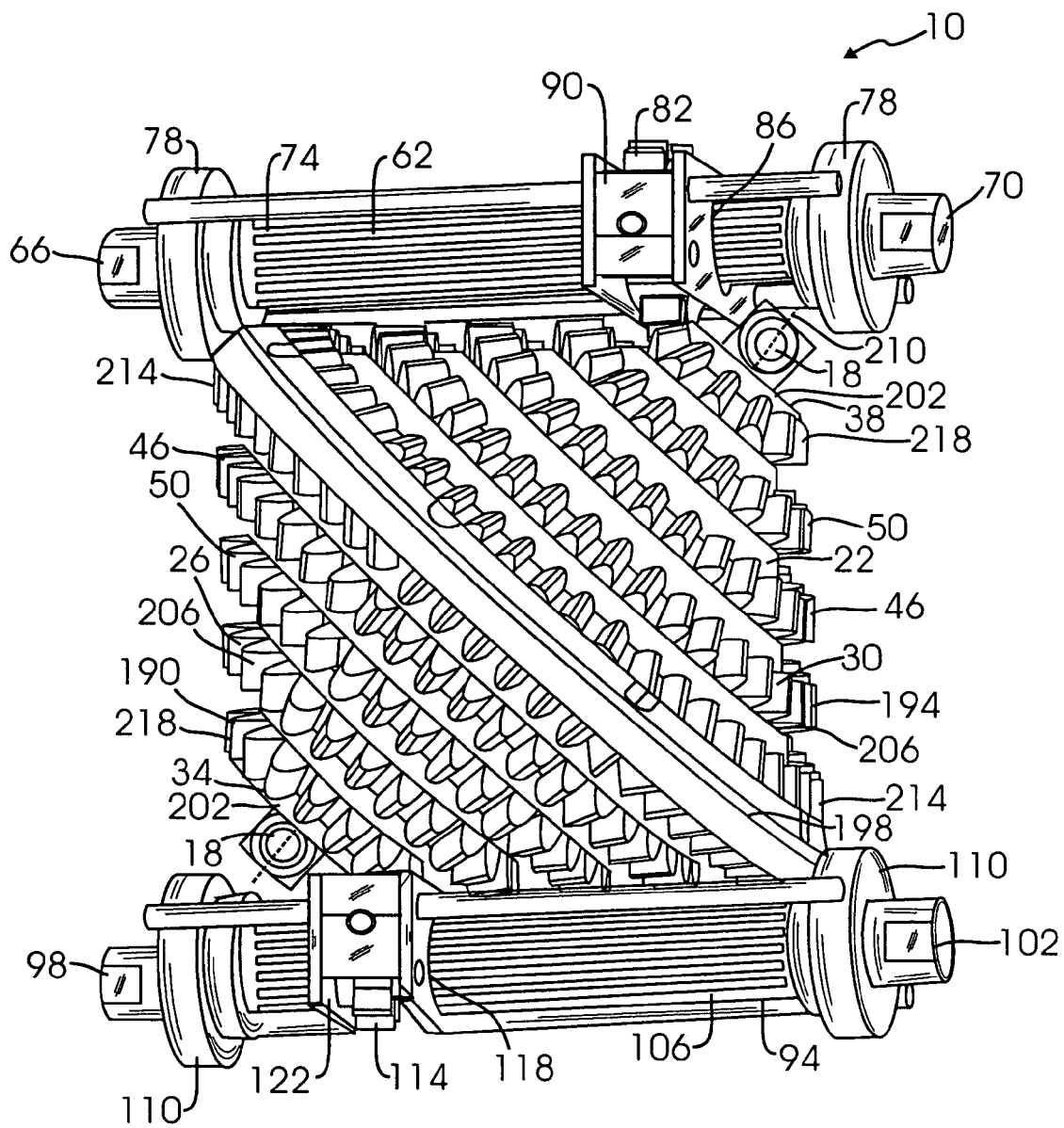
FIG. 5 is a perspective view of the FIG. 1 embodiment illustrating the first and second actuators, bushings, control rods and thrust plates.
Figure 6:
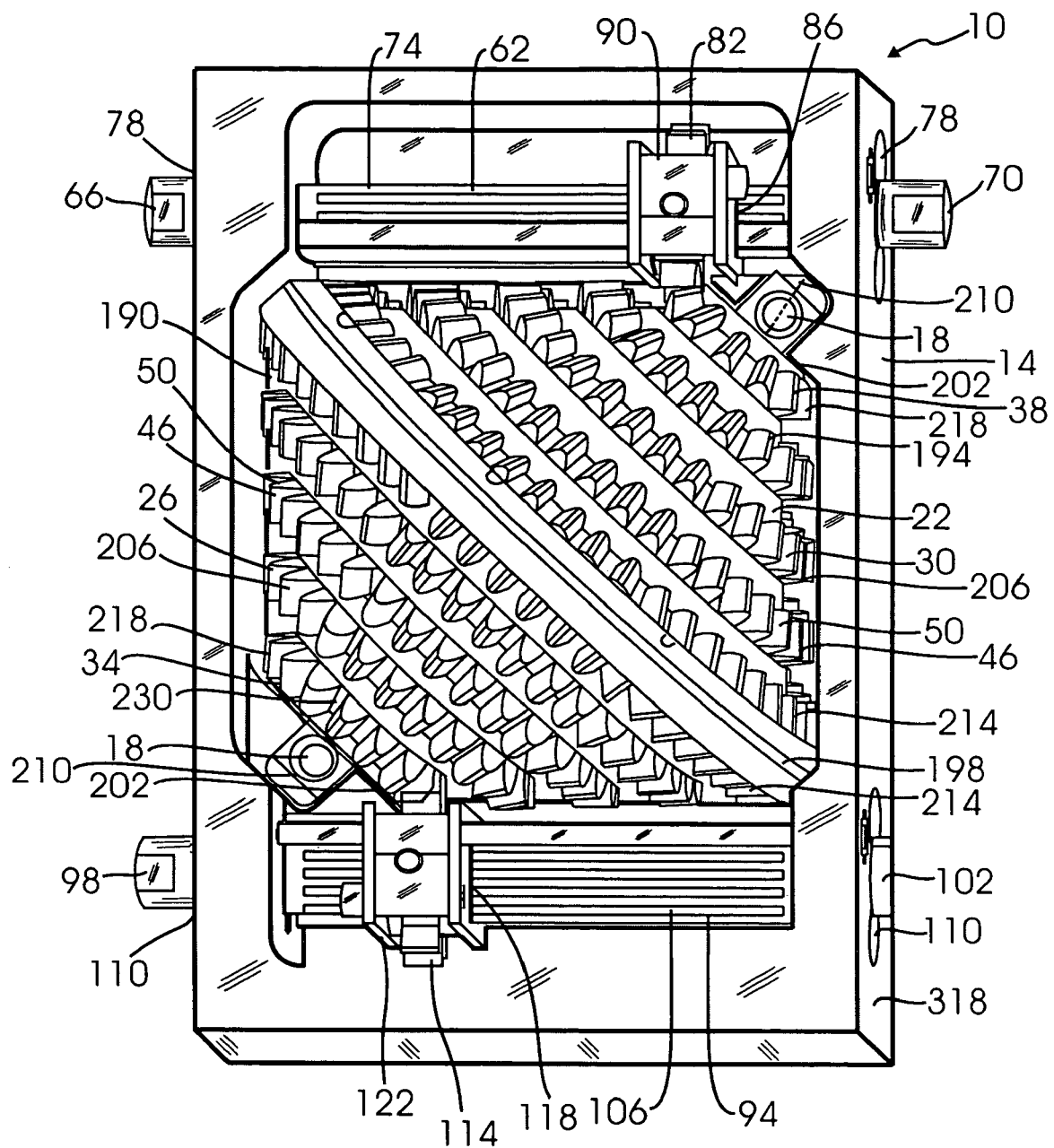
FIG. 6 is a perspective view of the FIG. 1 embodiment installed in a gear box.

(14) In another variant, as illustrated in FIGS. 1, 5, and 6, the driven shaft 94 is parallel to the driving shaft 62.

Figure 10:
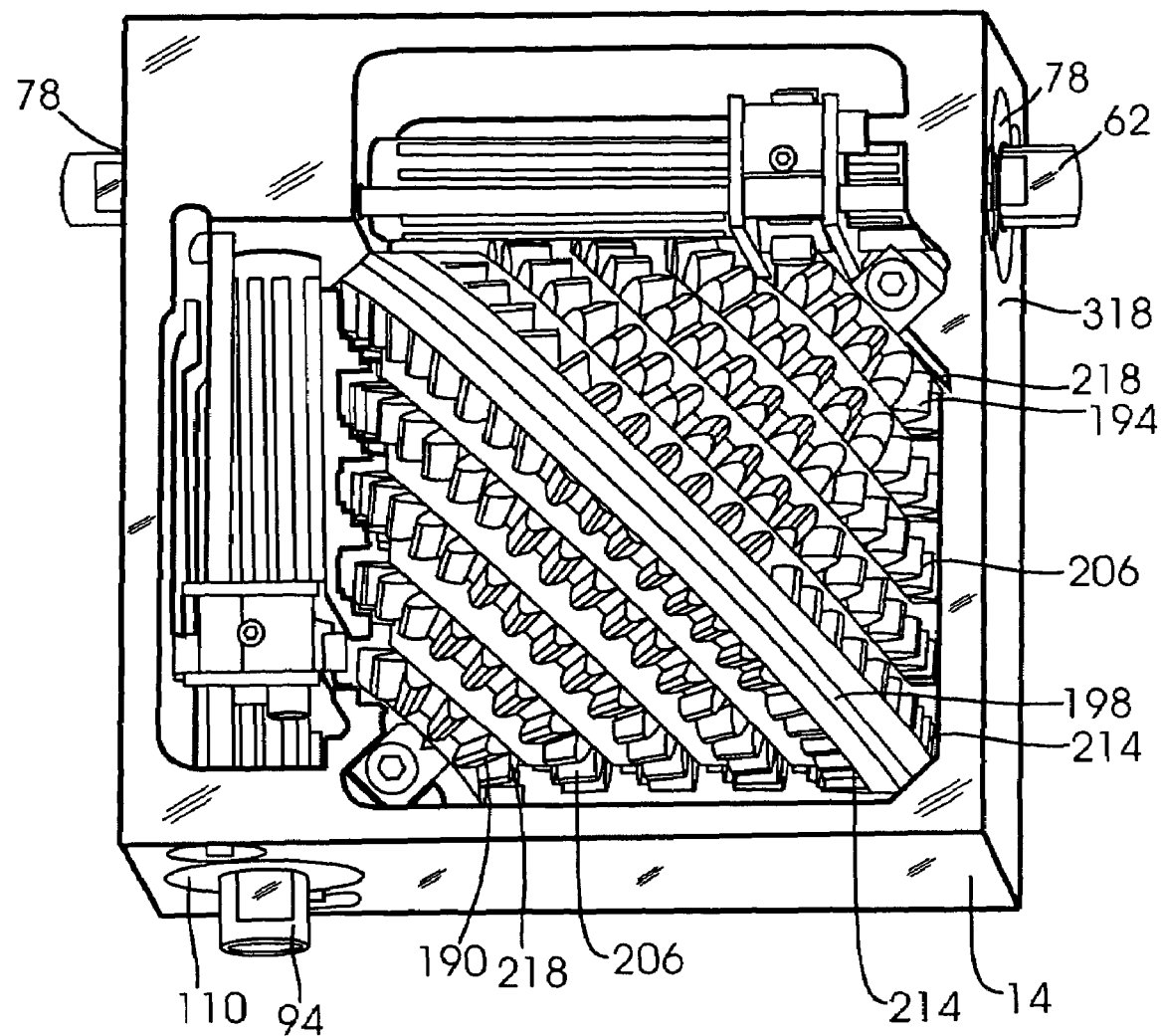
FIG. 10 is a plan view of a miter gear transmission with the driven shaft at 90 degrees to the driving shaft.

(15) In yet another variant, as illustrated in FIG. 10, the driven shaft 94 is perpendicular to the driving shaft 62.

(16) In a final variant of the invention, as illustrated in FIGS. 6 and 10, the bearings 78, 110 mounting at least one of the driving shaft 62 and the driven shaft 94 are attached to surfaces 318 perpendicular to the mounting platform 14.

The miter gear transmission 10 has been described with reference to particular embodiments. Other modifications and enhancements can be made without departing from the spirit and scope of the claims that follow.

The invention claimed is:

1. A miter gear transmission, comprising:

a mounting platform;

at least one bearing attached to said mounting platform;

an idler cluster, said idler cluster having first and second gear sets, first and second ends, a center point disposed between said first and second ends and being rotatably mounted to said at least one bearing;

said first gear set comprising a plurality of first gears, said first gears having decreasing numbers of gear teeth and being attached to said idler cluster from a point adjacent said center point outwardly toward said first end with a first gear having a largest number of teeth closest to said center point and with a first gear having a smallest number of teeth closest to said first end;

said second gear set comprising a plurality of second gears, said second gears having decreasing numbers of gear teeth and being attached to said idler cluster from a point adjacent said center point outwardly toward said second end with a second gear having a largest number of teeth closest to said center point and with a second gear having a smallest number of teeth closest to said second end;

a driving shaft, said driving shaft having a first end, a second end, a first rotational securing means and being mounted at said first and second ends of said driving shaft in bearings attached to said mounting platform;

said driving shaft being mounted at a forty-five degree angle to said idler cluster;

a first spur gear, said first spur gear being slidably mounted to said driving shaft and having a first mating rotational securing means slidably engaging said first rotational securing means;

a first actuator, said first actuator moving said first spur gear along said driving shaft to engage alternately each of said gears of said first gear set;

a driven shaft, said driven shaft having a first end, a second end, a second rotational securing means and being mounted at said first and second ends of said driven shaft in bearings attached to said mounting platform;

said driven shaft being mounted at a forty-five degree angle to said idler cluster;

a second spur gear, said second spur gear being slidably mounted to said driven shaft and having a second mating rotational securing means slidably engaging said second rotational securing means;

a second actuator, said second actuator moving said second spur gear along said driven shaft to engage alternately each of said gears of said second gear set; and wherein, when said first actuator positions said first spur gear to engage one of said first gears of said first gear set and said second actuator positions said second spur gear to engage one of said second gears of said second gear set, said driving shaft will rotate said idler cluster which will rotate said driven shaft at a speed determined by first and second gears of said first and second gear sets selected by said first and second actuators, respectively.

2. The miter gear transmission, as described in claim 1, wherein each of said first and second rotational securing means comprises at least one longitudinal keyway extending along each of said driving and driven shafts and each of said first and second mating rotational securing means comprises at least one mating longitudinal key disposed within a central aperture in each of said first and second spur gears.

3. The miter gear transmission, as described in claim 1, wherein each of said first and second rotational securing means comprises at least one longitudinal key extending along each of said driving and driven shafts and each of said first and second mating rotational securing means comprises at least one mating longitudinal keyway disposed within a central aperture in each of said first and second spur gears.

4. The miter gear transmission, as described in claim 1, wherein:
    said idler cluster comprises first and second hollow shell portions, each of said shell portions having a larger proximate end and a smaller distal end, a plurality of gear rings arcurately surrounding a centerline of said shell portion with a largest gear ring adjacent said proximate end and smaller gear rings extending toward said distal end;
    said first and second shell portions being joined at said proximate ends and having first and second bearing mounted at said distal ends;
    said bearings attaching to bearing mounts secured to said mounting platform.

5. The miter gear transmission, as described in claim 1, wherein said driven shaft is parallel to said driving shaft.

6. The miter gear transmission, as described in claim 1, wherein said driven shaft is perpendicular to said driving shaft.

7. The miter gear transmission, as described in claim 1, wherein said bearings mounting at least one of said driving shaft and said driven shaft are attached to surfaces perpendicular to said mounting platform.

8. The miter gear transmission, as described in claim 1, wherein each of said gear teeth is tapered to accommodate said forty-five degree angle between said idler cluster and each of said driving and driven shafts.

9. The miter gear transmission, as described in claim 8, wherein:
    each of said gear teeth is divided at a centerline between a back edge of said tooth, closest to said center point and a front edge, closest to one of said first and second ends of said idler cluster;
    each of said gear teeth tapers from said centerline toward said front edge;
    said taper being more acute for said gears having said smallest number of teeth and less acute for gears having larger numbers of teeth.

10. The miter gear transmission, as described in claim 1, wherein each of said actuators comprises:
    first and second thrust plates, said thrust plates disposed on either side of each of said first and second spur gears;
    at least one bushing, said bushing spacing apart said pairs of thrust plates;
    at least one control rod, said control rod sized and shaped to fit slidably within said at least one bushing and extending along each of said driving and driven shafts;
    said control rod being secured at either end to said mounting platform;
    said thrust plates and each of said first and second spur gears being displaced along said control rod by a shift mechanism;
    wherein when said shift mechanism displaces said thrust plates along said control rod, alternative gear combinations will be selected.

11. The miter gear transmission, as described in claim 10, wherein said first and second thrust plates are spaced apart by four bushings, two of said bushings securing together said thrust plates and two of said bushings each fitting slidably over one of two control rods.

12. The miter gear transmission, as described in claim 10, wherein said shift mechanism comprises:
    a looped cable, said looped cable having a first portion and a second portion;
    said first portion being attached at a first end to said first thrust plate and attached at a second end to a cable winder;
    said second portion being attached at a first end to said second thrust plate and attached at a second end to said cable winder;
    said winder tightening said first portion and loosening said second portion when moved in a first direction and tightening said second portion and loosening said first portion when moved in an opposite second direction; and
    wherein, when said cable winder is moved in said first direction, said actuator will move one of said spur gears to engage gears with larger numbers of teeth and when said cable winder is moved in said second direction, said actuator will move one of said spur gears to engage gears with smaller numbers of teeth.

13. The miter gear transmission, as described in claim 12 wherein said shift mechanism further comprises a cable sheath, said sheath enclosing said first and second portions and being secured to said mounting platform and said cable winder, thereby permitting said cable winder to be flexibly mounted.

14. The miter gear transmission, as described in claim 1, wherein:
    each of said first and second rotational securing means comprises at least one longitudinal, partial cylindrical trough extending along each of said driving and driven shafts;
    each of said first and second mating rotational securing means comprises at least one mating partial cylindrical trough disposed within a central aperture in each of said first and second spur gears;
    at least one ball bearing, said ball bearing being sized and shaped to fit slidably between said partial cylindrical trough and said mating partial cylindrical trough, is disposed between each of said partial cylindrical troughs and each of said mating partial cylindrical troughs; and
    wherein, when either of said first and second actuators move said first and second spur gears along said driving and driven shafts, friction relating to said movement will be reduced.

15. The miter gear transmission, as described in claim 14, wherein:
    each of said partial cylindrical trough and said mating partial cylindrical trough enclose at least two ball bearings;
    at least one of said ball bearings extending outwardly beyond one of an inner and an outer lateral edge of a central aperture in either of said first and second spur gears;

portions of said ball bearings extending outwardly beyond one of said inner and said outer lateral edge serving as a thrust bearing for either of said first and second actuators.

16. The miter gear transmission, as described in claim 15 wherein:

each of said partial cylindrical trough and said mating partial cylindrical trough enclose at least four ball bearings;

said mating cylindrical trough comprises a centrally disposed barrier ledge, said ledge abutting first and second center mounted ball bearings and being sized to cause innermost and outermost ball bearings to extend outwardly beyond one of said inner and said outer lateral edges, respectively.

* * * * *